United States Patent [19]

Wiseman

[11] Patent Number: 4,676,264
[45] Date of Patent: Jun. 30, 1987

[54] FLUID FLOW CONTROL APPARATUS
[75] Inventor: Michael D. Wiseman, Bovina, Tex.
[73] Assignee: Hydro Pulse, Inc., Houston, Tex.
[21] Appl. No.: 778,846
[22] Filed: Sep. 23, 1985
[51] Int. Cl.$^4$ ............................................. F16K 11/02
[52] U.S. Cl. ............................... 137/119; 137/624.14; 137/624.18
[58] Field of Search ................. 137/624.14, 624.11, 137/119, 624.18

[56] References Cited

U.S. PATENT DOCUMENTS

| Re. 30,224 | 3/1980 | Ortega | 137/625.47 |
|---|---|---|---|
| 2,506,097 | 5/1950 | Melichar | 137/625.11 |
| 2,518,001 | 8/1950 | Goodard | 137/624.14 X |
| 2,979,082 | 4/1961 | Neves | 137/625.11 |
| 3,618,637 | 11/1971 | Santomieri | 137/625.11 X |
| 3,779,269 | 12/1973 | Gould | 137/624.14 X |
| 4,458,708 | 7/1984 | Leonard | 137/625.11 X |

Primary Examiner—Alan Cohen
Attorney, Agent, or Firm—Delmar L. Sroufe

[57] ABSTRACT

A liquid flow control valve which selectively directs liquid flow to one or more outlets in a cylindrical valve body by the positioning within said body of a rotatable cylindrically-shaped drum with one or more peripheral sealing plates rotatable to cover some of said ports while leaving other such ports uncovered. Movement of the drum and the associated sealing member or members is imparted by fluid flow activated vanes or impellers.

4 Claims, 8 Drawing Figures

FLUID FLOW CONTROL APPARATUS

BACKGROUND OF THE INVENTION

This invention relates to liquid flow control valves, and more particularly to water flow control valves used in farmland irrigation.

In the irrigation of crops which are planted in rows, it is common to introduce water at the high end of a field in order that the water may flow by gravity down the furrows to the opposite end of the field. In one method of such irrigation, commonly called continuous irrigation, water is continuously introduced at the high end of the field until the water has reached and had sufficient time to soak the low end of the field. This method of irrigation is not efficient because a considerable amount of water is wasted in run-off at the low end of the field and in soaking into the ground deeper than the plant root zone at the high end of the field.

An improved method of furrow irrigation, called "surge irrigation" applies water at the high end of the field in a series of timed increments, allowing the soil to dry between the alternate wettings. When the soil is thus wetted and allowed to dry, a thin seal forms on the soil surface reducing the soil's permeability. The alternate wetting and drying of the higher end of the field and the formation of the thin seal speeds the advance of water down the furrow during subsequent wettings and minimizes unnecessary over-soaking of the high end of the field.

In the practice of surge irrigation, farmers have found it most efficient to use an automatic flow control valve to direct the flow of water to either of two distribution pipes on the high end of the field, each of which applies water to a different set of furrows. Such a valve applies the water to each such distribution pipe in sequence, so that while one set of furrows is being wetted, the other set is drying. The valve commonly used is a standard butterfly valve operated by an attached electric motor. Because the valves and distribution pipes are usually located beyond the reach of electric utility lines, and because they must be frequently moved from place to place in the field, the valve motors are typically powered by automotive storage batteries. Use of such valves has caused problems, principally arising out of the fact that the battery is heavy and must be frequently recharged due to the large power consumption of the motor. Furthermore, the design of butterfly valves causes a flow restriction which reduces the flow rate through such conventional valves. As a result, sand which is entrained in irrigation water, settles to the bottom of the valve and hinders proper valve function.

SUMMARY OF THE INVENTION

The present invention relates to a flow control valve in which all or a substantial part of the power for actuation of the valve is provided by the flow of liquid through the valve. The mechanism which selectively directs liquid flow to the desired valve outlet or outlets is a drum having a segment axially mounted within a cylindrical valve body. The drum segment comprises a sealing plate with a cylindrical configuration which conforms to the interior surface of the valve body. Vanes on the drum impart a rotary motion to the drum when liquid flows through the valve. Rotary torque induced by flow through the vanes may be supplemented by mounting an impeller on the end of the drum.

The position of the solid section, segment or segments of the drum, the sealing plate, determines the outlet or outlets through which the liquid flows; the solid section is adapted to block one outlet at a time when it aligns with such outlet. Flow of liquid is metered through the outlets by the rotation of the drum which is stopped and positioned by the action of a locking rod or plunger controlled by an electrical solenoid. When the electrical solenoid is de-energized, a spring causes the plunger attached to the core of the solenoid to extend from the solenoid body. In the extended position, the plunger contacts an engagement member on the drum and locks the drum into position. When the solenoid is briefly energized, the plunger retracts, the drum is freed and rotates until an engagement member on the drum contacts the plunger after it has returned to its extended position.

The action of the solenoid, and therefore the operation of the valve, is controlled by an attached programmable electronic timer. The timer can be programmed by the user to allow flow through different outlets for different periods of time, and the duration of fluid flows through each outlet can be made to vary with time.

In one aspect of the present invention, it has utility in combination with conventional electric power rotating means. In this application of the invention, torque provided by flow of the liquid through the valve may be used to reduce significantly the required size of said conventional electric power rotating means, the current demand, and the size of the battery.

It is an object of this invention to provide a lightweight, portable flow control valve of a design that does not restrict flow.

It is yet another object of this invention to provide a simple flow control valve with a minimum of moving parts.

It is another object of this invention to provide a flow control valve in which the torque necessary to activate the flow control mechanism is provided by the flow of the liquid through the valve.

It is yet another object of this invention to provide a flow control valve in which the flow state is changed by briefly energizing a solenoid instead of energizing an electric motor.

It is a further object to provide a flow control valve with significantly reduced power consumption and which allows the use of a relatively lightweight battery with improved useful life between rechargings.

It is another object of this invention to provide a flow control valve in which swirling action of the water flowing through the valve keeps any entrained sand in suspension, thus preventing sand from settling on the valve sealing surfaces.

It is yet another object of this invention to provide a flow control valve in which the alternation of flow through the various outlet ports is timed by a programmable computing device and which may be programmed to vary the flow sequences as a function of time.

It is still another object of this invention to provide a liquid flow control valve having a hollow cylindrical body provided with at least one inlet port and a plurality of outlet ports, a cylindrical drum member rotatably mounted inside said body, said drum member having one or more cylindrically contoured sealing plates, each of which is arranged to successively close each of said outlet ports when said drum member is rotated, means for rotating said drum member, and means for locking and unlocking said drum member for positioning same into predetermined positions with respect to said outlet ports.

BRIEF DESCRIPTION OF THE DRAWINGS

Further details are explained below with the help of the examples illustrated in the attached drawings in which.

DESCRIPTION OF THE PREFERRED EMBODIMENT

Figure 1:
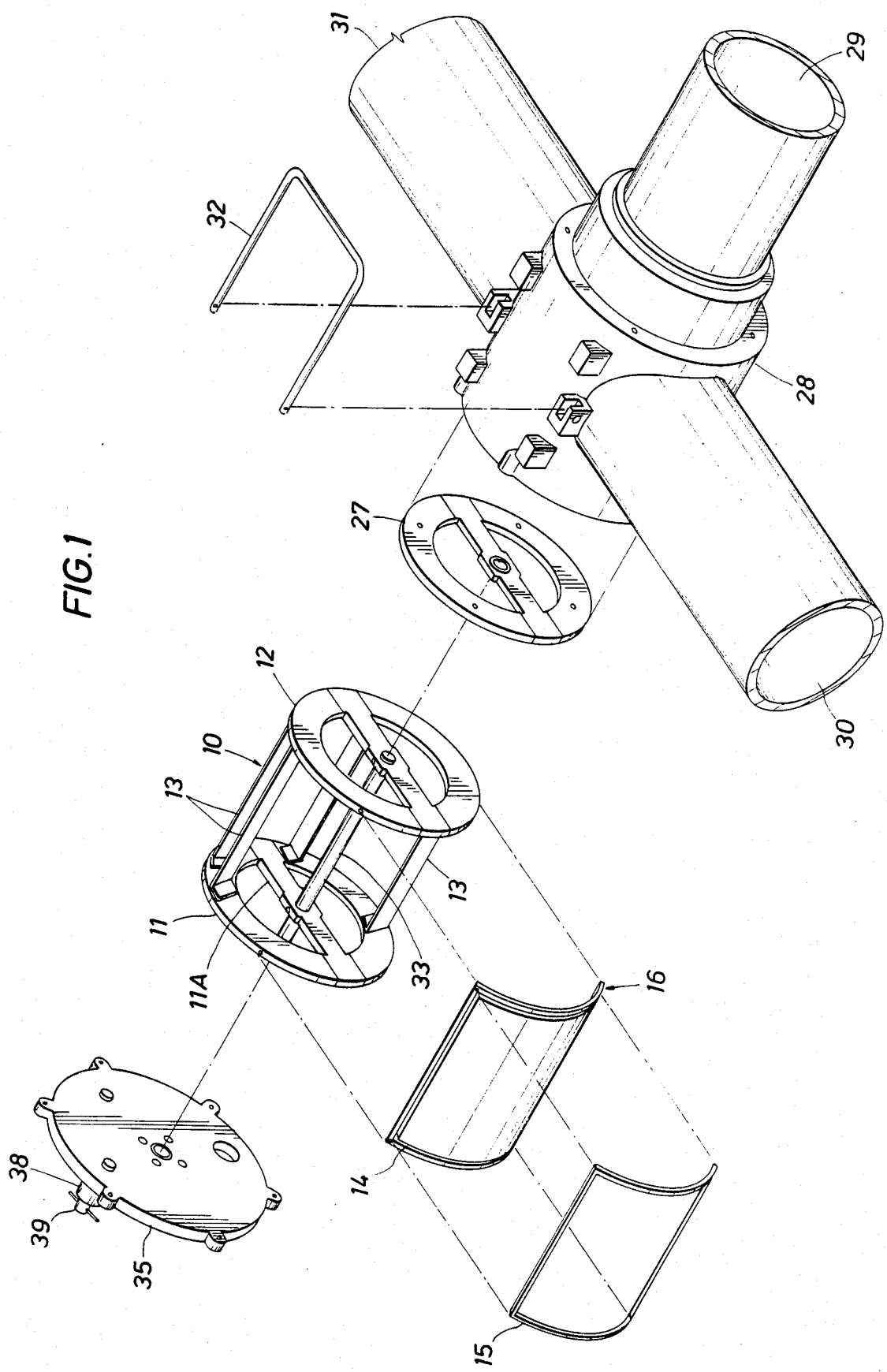
FIG. 1 is an overall view of the flow control valve according to the present invention.

In the drawings, two circular support members 11 and 12 of rotatable drum 10 are connected by axially aligned vanes 13. Cylindrically shaped support plate 14 is attached to the periphery of circular support members 11 and 12. Elastomer shoe member 15 is attached to cylindrically shaped support plate 14 to form, in combination, cylindrical sealing or blocking plate 16.

Circular spider 27 is mounted inside cylindrically shaped valve body 28, on the inlet side of said valve body. Valve body 28 is furnished with inlet port 29, a first outlet port 30, and a second outlet port 31.

Carrying handle 32 is rotatably mounted on the top of valve body 28.

Figure 2:
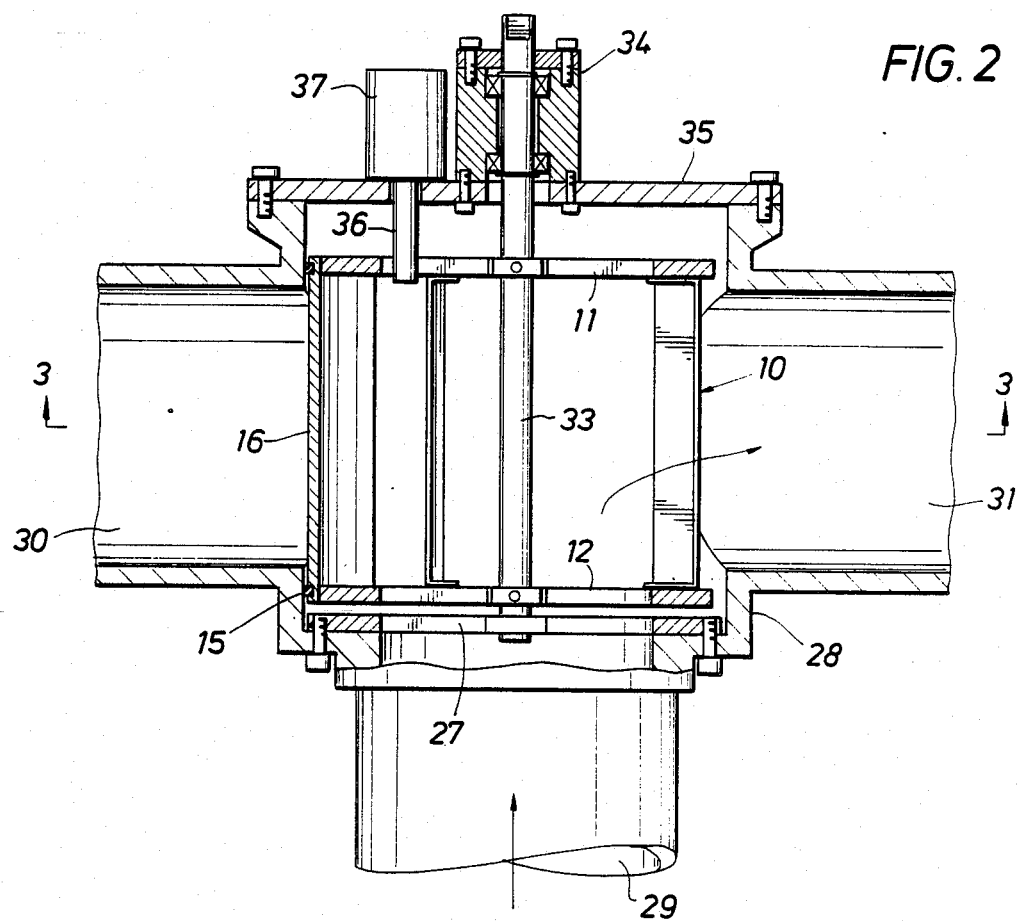
FIG. 2 is a top view of a horizontal cross section of the valve and internals.

Drum 10 is rotatably mounted inside valve body 28 on axle 33. The inlet end of axle 33 passes through the circular opening in the center of spider 27. The opposite end of axle 33 passes through stuffing box 34 which is externally mounted on end plate 35. The end of axle 33 which passes through stuffing box 34 has two opposing flat surfaces machined thereon, as shown in FIG. 2, to allow said axle to be manually rotated with a wrench or similar tool. Means for locking drum 10, comprising a longitudinal member, such as locking rod 36 (FIG. 2) passes through an opening in valve end plate 35 and forms the actuated member of solenoid 37, said solenoid 37 being externally mounted on valve end plate 35.

When coils 42 of solenoid 37 are electrically de-energized, locking rod 36 is urged to its extended position by a spring 43 in the solenoid housing 44. In said extended position, locking rod 36 extends past the position of engagement member 11A of support member 11.

When solenoid 37 is electrically energized, locking rod 36 is moved to its retracted position by the electromagnetic action of the coils 42 of solenoid 37. Locking rod 36 is of such length that, in its retracted position, it does not extend past the position of engagement member 11A of support member 11.

Figure 4:
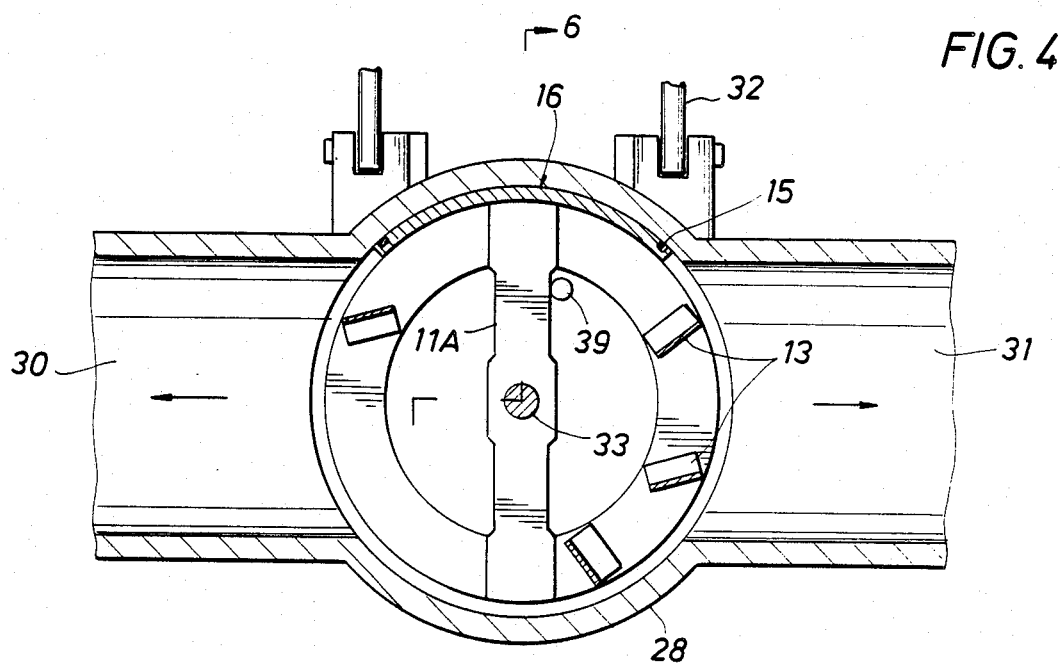
FIG. 4 is a front or inlet view of a vertical cross section of the valve and internals with the valve internals locked in the dual flow mode.
Figure 6:
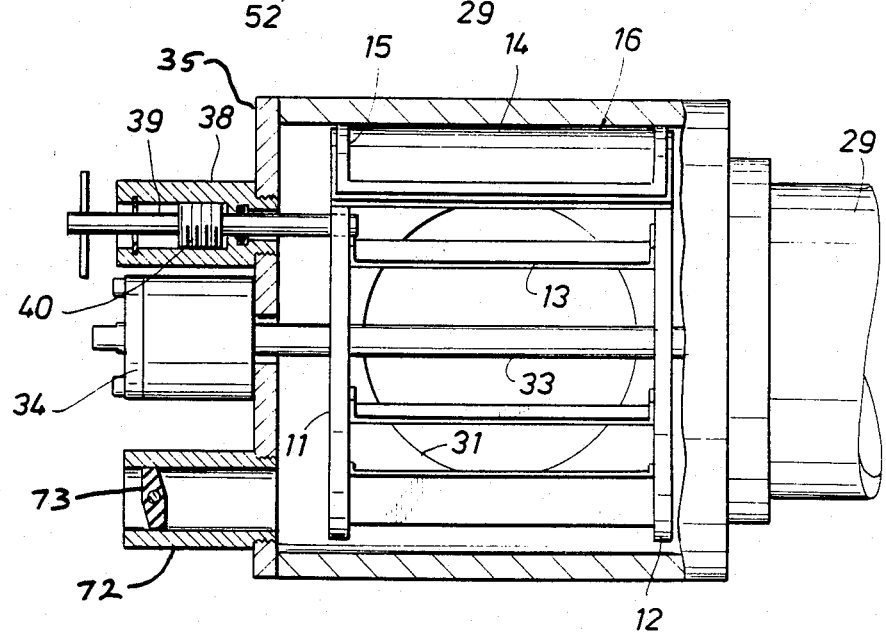
FIG. 6 is a side view of a vertical cross section of the valve body taken essentially along line 6—6 of FIG. 4 with the internals therein shown in elevation.
Figure 7:
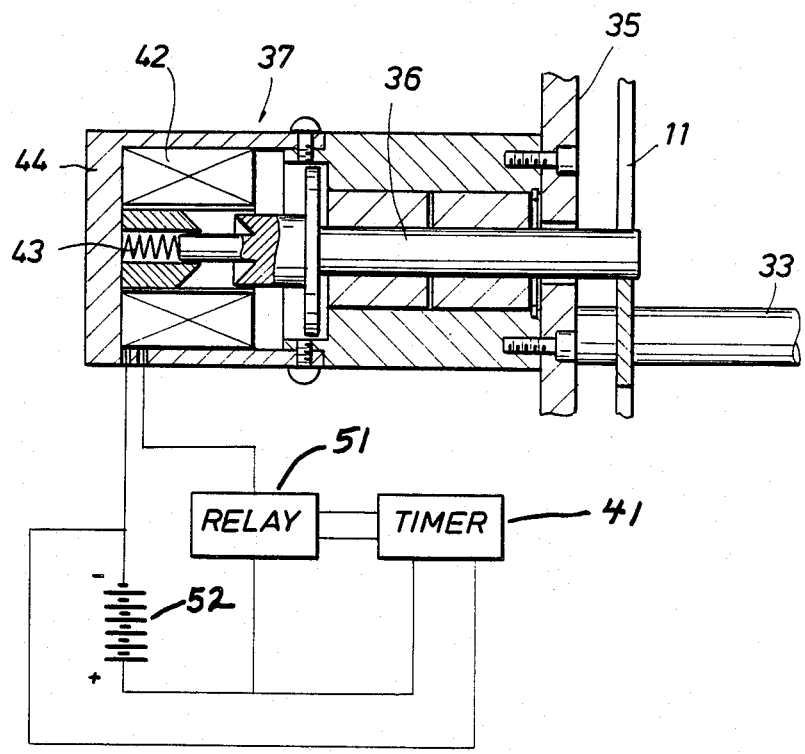
FIG. 7 is a cross-sectional view of the solenoid and internal spring which biases the solenoid plunger and a schematic diagram of the timer and relay associated with this solenoid assembly.

Stuffing box 38 (FIG. 6) is externally mounted on end plate 35 and threaded blocking rod 39 passes through said stuffing box, through threaded bushing 40 and through an opening in end plate 35. When blocking rod 39 is rotated in the clockwise direction, it extends through an opening in end plate 35, and when rotated in a counter-clockwise direction, it retracts. The length of blocking rod 39 is such that, when rotated clockwise a sufficient number of turns, said blocking rod will extend past the position of engagement member 11A of support member 11, as illustrated in FIG. 6. With the blocking rod 39 extended, the sealing plate 16 is locked so as to allow flow through both outlet ports 30 and 31, as illustrated in FIG. 4. This is called the dual flow mode.

Figure 3:
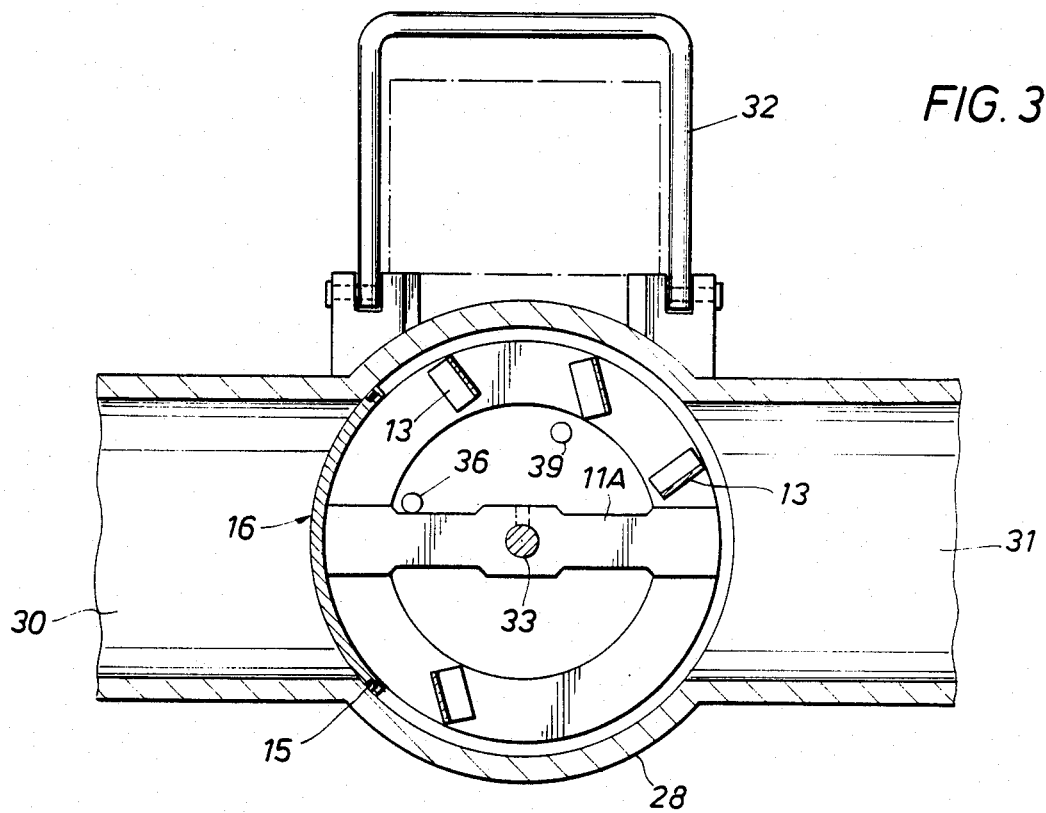
FIG. 3 is a front or inlet view of a vertical cross section of the valve and internals taken generally along line 3—3 of FIG. 2, with the valve internals blocking flow to one of the outlet ports.

Axially aligned vanes 13 (FIG. 3 and FIG. 4) are mounted at such angles, that liquid flow through outlet port 30 or outlet port 31 imparts a torque on rotatable drum 10 that is clockwise when viewed from the inlet side of the valve body in the embodiment shown in FIG. 3. To overcome the suction forces on the sealing plate when it is over the closed port, a set of four vanes 13 are used in this illustration. The vanes 13 are arranged to generate the maximum torque at the start of rotation. As the rotation continues, the suction force on sealing plate 16 decreases as the sealing plate rotates toward the other outlet port.

When fluid is admitted to inlet port 29 of valve body 28, said fluid flows through one or both of outlet ports 30 and 31. Said fluid flow rotates drum 10 in the clockwise direction. When solenoid 37 is de-energized, drum 10 rotates until engagement member 11A contacts locking rod 36. Said locking rod 36 stops the rotation of drum 10 and locks it in position. As may be seen from FIG. 3, the locking action of locking rod 36 is capable of locking drum 10 into either of two positions, one position rotated 180° with respect to the other. Cylindrically contoured sealing plate 16 is so located with respect to engagement member 11A that in the position shown in FIG. 3 (first position) said sealing plate 16 blocks flow through outlet port 30.

If drum 10 is locked into a first position, as shown in FIG. 3, and solenoid 37 is energized, locking rod 36 retracts, and drum member 10 rotates under action of the liquid flow. Solenoid 37 is energized until engagement member 11A rotates past locking rod 36 and is then de-energized. Locking rod 36 then extends, engages the opposite end of engagement member 11A, and stops the rotation of drum 10 in a second position (not shown), where sealing plate 16 blocks flow from outlet port 31. Field tests indicate that the solenoid must be energized for approximately 200 milliseconds to allow engagement member 11A to rotate past locking rod 36. In like fashion, energizing solenoid 37, when sealing plate 16 is blocking flow through outlet port 31, will cause drum 10 to rotate back to the position shown in FIG. 3.

The spacing of the axially aligned vanes 13, as shown in FIG. 3 and FIG. 4, is such that the flow induced torque applied to drum 10 is at a maximum value when drum 10 is in the position shown in FIG. 3 and decreases to a minimum when drum 10 is in the position shown in FIG. 4. It may be seen that applying maximum torque to drum 10 to overcome its inertia and then reducing said torque as drum 10 continues to rotate results in smoother operation of the valve.

Thus, during the operation of the flow control valve of FIGS. 1-4 described herein, energizing solenoid 37 for a predetermined length of time will change the position of sealing plate 16 from a first position, which blocks flow from outlet port 30, to a second position, which blocks flow from outlet port 31. In like fashion, each subsequent energizing of solenoid 37 will direct flow to the opposite outlet port. While the sealing plate 16 is traveling between its first and second positions, flow is allowed through both outlet ports 30 and 31 as is readily apparent from FIG. 4. Thus, the flow is neither terminated nor initiated abruptly, but is continuous.

A third outlet port 72 may be provided in the embodiment of FIGS. 1-4 with a control valve, such as butterfly valve 73, to control the discharge of water through end plate 35.

In the preferred embodiment of the present invention, the action of solenoid 37 is controlled by a timer means, such as a programmable, digital timer 41. Said programmable timer 41 acts in programmed sequential steps to close and open an electrical relay 51 in series with 12 volt battery 52 which energizes solenoid 37 when said electrical relay is closed.

Figure 5:
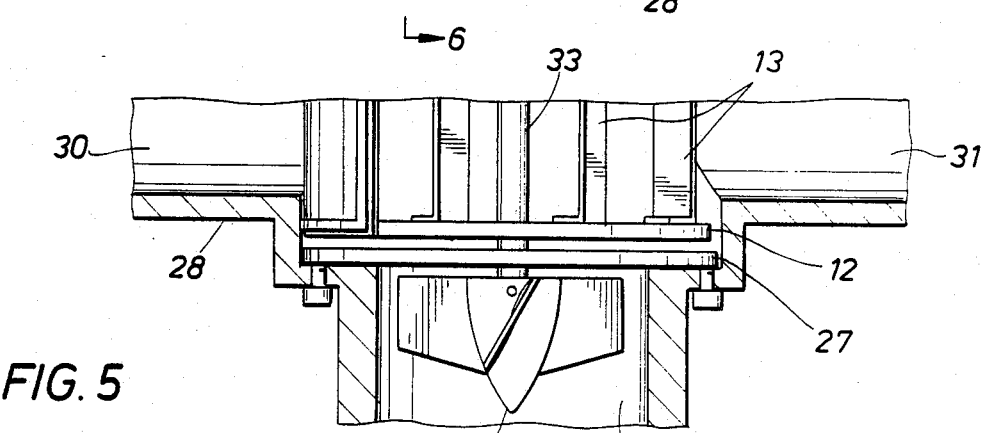
FIG. 5 is a top view of a horizontal cross section of the valve body with the internals, including the impeller of an alternative embodiment shown in elevation.

In an alternate embodiment shown in FIG. 5, impeller 52 is mounted on the inlet end of axle 33 to provide additional flow induced torque.

Figure 8:
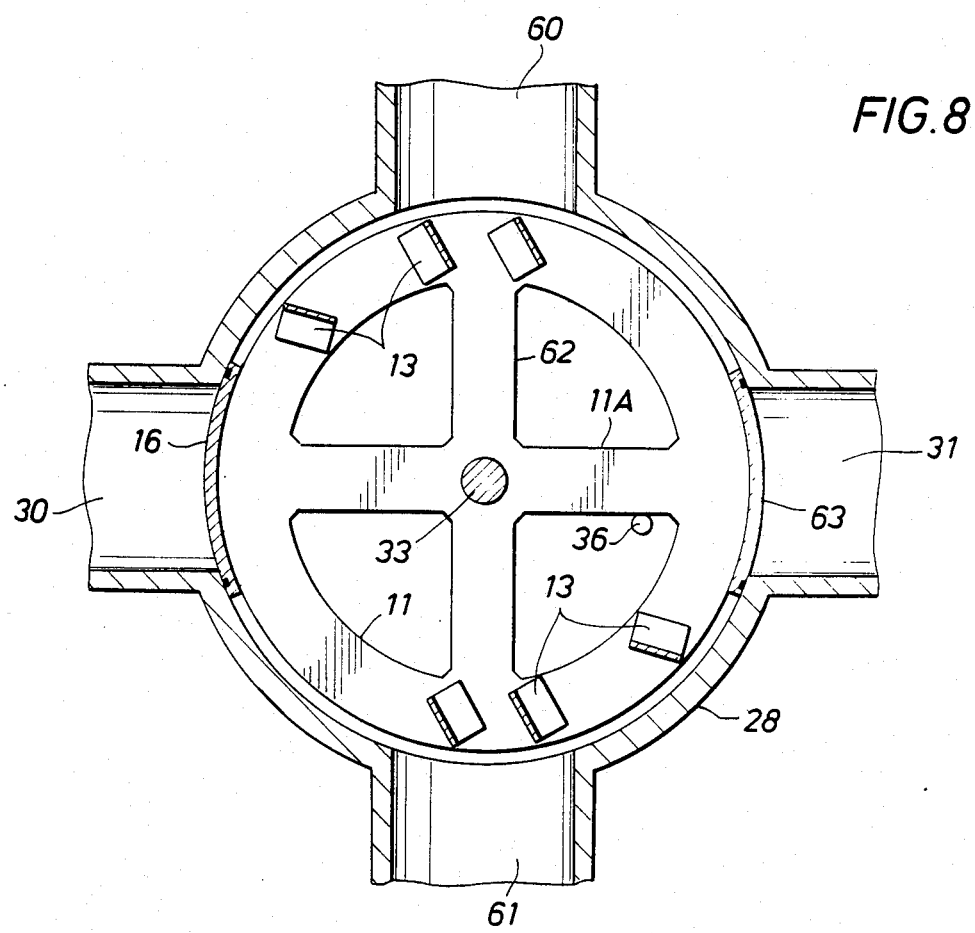
FIG. 8 is a schematic diagram of an alternate embodiment of the invention which has four outlet ports and two sealing plates.

In another alternate embodiment, as shown in FIG. 8, the valve body 28 is furnished with a third outlet port 60 and a fourth outlet port 61. Rotatable drum 10 is furnished with a second engagement member 62 and a second sealing plate 63. Second engagement member 62 is positioned at right angles to engagement member 11A and second sealing plate 63 is horizontally opposed from sealing plate 16. It may be seen that when rotatable drum 10 is in a first position, as shown in FIG. 8, outlet ports 30 and 31 are blocked, and outlet flow is through outlets 60 and 61. In this embodiment, briefly energizing solenoid 37 will allow rotatable drum to rotate approximately 90° to a second position (not shown) in which outlet ports 60 and 61 are blocked and outlet flow is through outlet ports 30 and 31.

It is therefore apparent that the present invention is one well adapted to obtain all of the advantages and features hereinabove set forth, together with other advantages which will become obvious and inherent from a description of the apparatus itself. It will be understood that certain combinations and subcombinations are of utility and may be employed in various flow control or metering applications without reference to other features and subcombinations. This is contemplated by and is within the scope of the present invention.

What is claimed is:

1. A fluid flow control apparatus, comprising:
   (a) a hollow, cylindrical body provided with at least one inlet port and a plurality of outlet ports;
   (b) a cylindrical drum member rotatably mounted inside said body, said drum member having
      (1) one or more engagement members and
      (2) one or more cylindircally contoured sealing plates, each of which successively aligns with and sealingly closes each of said outlet ports when said drum member is rotated;
   (c) a plurality of fluid flow actuated vanes mounted in axial alignment on said drum member for rotating said drum member;
   (d) means for locking said drum member for positioning saime into predetermined positions with respect to said outlet ports, said locking means comprising:
      (1) a longitudinal member slidably mounted on said body which engages one of said engagement members when said longitudinal member moves to a first position and which disengages said engagement member when said logitudinal member moves to a second position,
      (2) biasing means for moving said longitudinal member to said first position, said biasing means comprising a spring member assembly, and
      (3) urging means for moving said longitudinal member to said second position, said urging means comprising an electrical solenoid externally mounted on said body;
   (e) programmable means for timing the locking and unlocking of said locking means; and
   (f) separate means for locking said drum member into such position that none of said outlet ports are blocked.

2. A fluid flow control apparatus as recited in claim 1, wherein said separate locking means comprises a longitudinal member mounted in said body which engages one of aid engagement members when said longitudinal member moves to a first position and which disengages said engaagement member when said longitudinal member moves to a second position, and further comprising urging means for moving said longitudinal member to said first and second positions.

3. A flow control apparatus as recited in claim 2, further comprising a plurality of elastomer shoe members, one of which is mounted on the exterior surface of each of said sealing plates.

4. A fluid flow control apparatus as recited in claim 3, further comprising an impeller coaxially mounted on said drum member to impose torque on said drum member when fluid flows through said flow control apparatus for rotating said drum member.

* * * * *